United States Patent [19]

Pan

[11] Patent Number: 5,288,047
[45] Date of Patent: Feb. 22, 1994

[54] JOINER OF DECORATIVE LIGHT BULB

[76] Inventor: Wun-Fang Pan, No. 125, Lane 99, Tin Pu Road, Hsinchu, Taiwan

[21] Appl. No.: 963,546

[22] Filed: Oct. 20, 1992

[51] Int. Cl.⁵ ............................................. E04B 7/18
[52] U.S. Cl. .................................................. 248/229
[58] Field of Search .................. 248/229, 231.8, 231.7

[56] References Cited

U.S. PATENT DOCUMENTS

| | | | |
|---|---|---|---|
| 1,044,772 | 11/1912 | Gilbough | 248/229 |
| 1,861,151 | 5/1932 | Buschman | 248/229 |
| 3,193,229 | 7/1965 | Stock | 248/229 |
| 3,228,640 | 1/1966 | Wolsh | 248/229 |
| 3,596,859 | 8/1971 | MacDonald | 248/229 |
| 3,666,372 | 5/1972 | Lipkowski | 248/229 |
| 4,193,572 | 3/1980 | Horiuchi et al. | 248/231.8 |
| 5,141,192 | 8/1992 | Adams | 248/229 |

Primary Examiner—Scott Smith
Attorney, Agent, or Firm—Morton J. Rosenberg; David I. Klein

[57] ABSTRACT

A connector for a decorative light set comprises first and second clamping members which are fixedly attached to each other and have substantially semi-circular bodies which define linearly opposed first and second openings that releasably and grippingly receive a frame member of a decorative sign and a base of a light bulb, respectively.

1 Claim, 4 Drawing Sheets

JOINER OF DECORATIVE LIGHT BULB

BACKGROUND OF THE INVENTION

1. Field of the Invention

This invention relates to an improved light bulb connector for a decorative light set. In particular, this invention pertains to a connector having first and second clamping members fixedly attached to each other. Each clamping member comprises a substantially, semi-circular body having an opening therein. The openings of the opposed first and second clamping members are linearly aligned with respect to each other.

2. Prior Art

In prior art decorative light systems, a frame member may be used to construct a sign of any desired configuration. The light bulbs are tied to the frame member, as shown in FIG. 1. When the light bulbs are lit, the decorative configuration of the frame member can be seen. In such prior art systems, attachment of the light bulbs to the frame member has been found to be unsecure. Furthermore, in using such systems, it has been found to be difficult and time consuming to tie and untie each individual light bulb to the frame member.

SUMMARY OF THE INVENTION

In view of the previously described disadvantages of the prior art, the present invention concept provides a connector for attaching a string of lights to a frame member.

It is an object of the present invention to mitigate and/or obviate the above-mentioned drawbacks of prior art decorative light systems in a manner set forth in the Description of the Preferred Embodiment.

A primary object of the present invention is to provide a connector with two clamping members which releasably and grippingly secure a frame member and a base of a light bulb, respectively.

Another object of the present invention is to provide a connector which is easily manufactured and used.

Further objects and advantages of the present invention will become apparent as the following description proceeds, and features and novelty are characterized in the Claims annexed to and forming a part of this invention.

DESCRIPTION OF THE PREFERRED EMBODIMENTS

Figure 1:
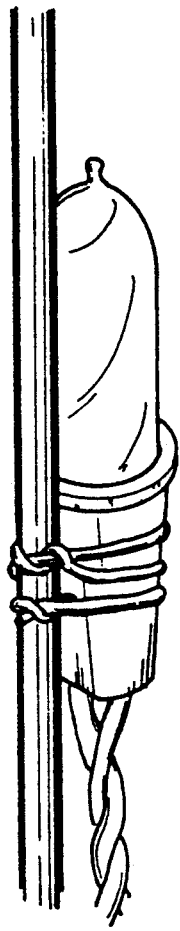
FIG. 1 is a perspective view of a prior art connecting structure of a light bulb tied to a frame member.
Figure 2:
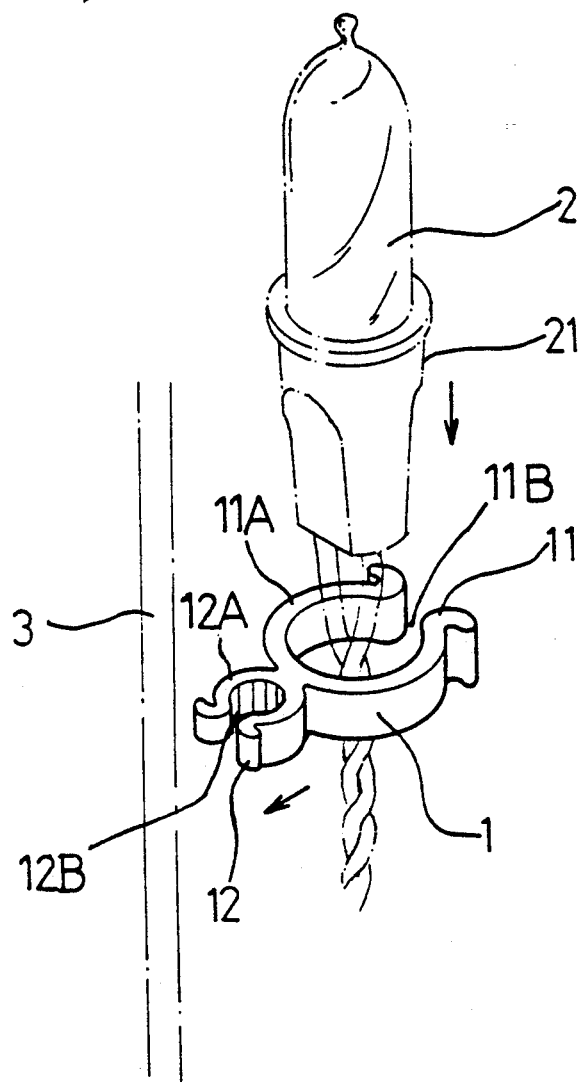
FIG. 2 is a perspective view of a connector in accordance with the present invention.
Figure 3:
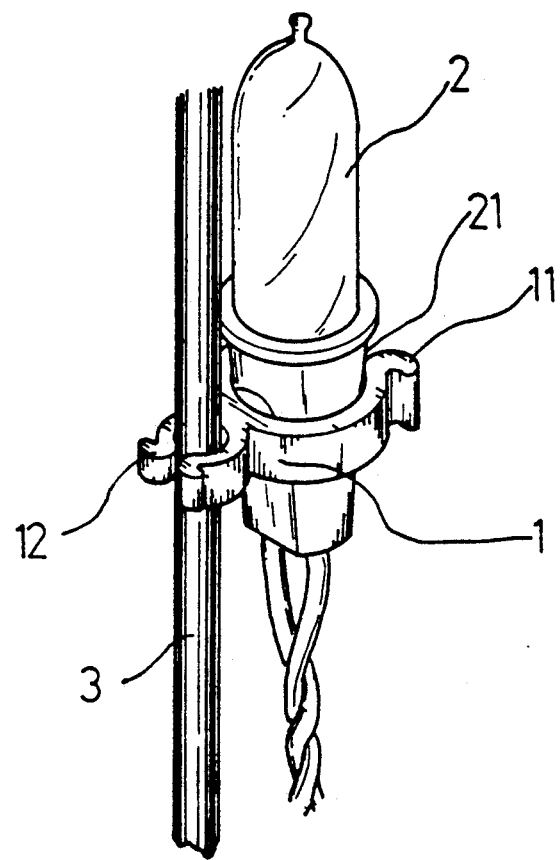
FIG. 3 is a perspective view of a connector secured to a light bulb and a frame member in accordance with the present invention; and, FIG. 4 is an exemplary embodiment of a frame member provided with a plurality of connectors in accordance with the present invention.

Referring now to FIGS. 2 and 3, there is shown a connector 1 of the present invention having a first clamping member 11 and a second clamping member 12. The clamping members 11 and 12 are fixedly attached to each another. First clamping member 11 comprises a substantially, semi-circular body 11A which defines an opening 11B therein. The opening 11B of the clamping member 11 is adapted to releasably and grippingly receive therein a base 21 of a light bulb 2. The second clamping member 12 comprises a substantially, semi-circular body 12A defining an opening 12B therein. The opening 12B of clamping member 12 is adapted to releasably and grippingly receive therein a frame member 3. The openings 11B and 12B are suitable for clamping of the aforementioned articles. The connections made by the first and second clamping members 11 and 12 with the base 21 of a light bulb 2 and a frame member 3, respectively, provide a secure mounting coupled with a simple technique of attachment. The connecting member 1 may be formed of plastic, and may be easily and economically manufactured.

Figure 4:
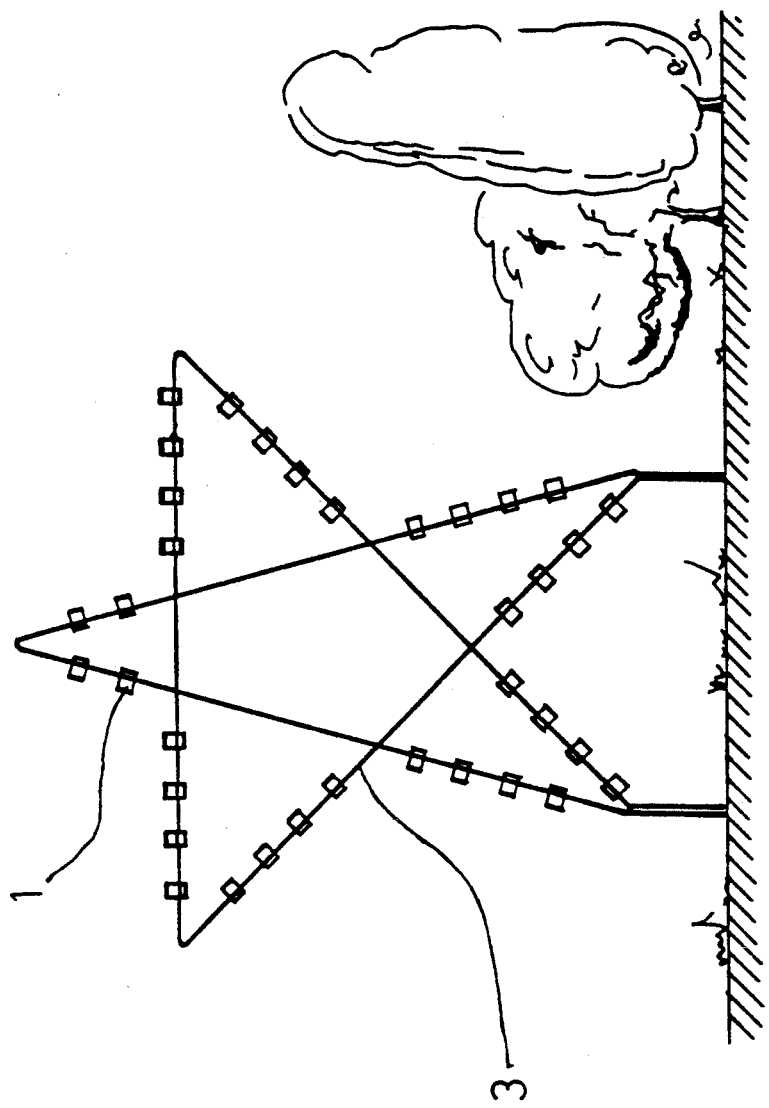

As shown in FIG. 4, when a plurality of connectors 1 are attached to the frame member 3, the bases 21 of light bulbs 2 are securely received within respective openings 11B of the first clamping members 11. The frame member 3 is securely received within the openings 12 of the respective second clamping members 12. When the light bulbs 2 are lit, the decorative configuration of the frame member 3 provides an aesthetic feature to the concept.

As various possible embodiments might be made of the above invention without departing from the scope of the invention, it is to be understood that all matter herein described as shown in the accompanying Drawings is to be interpreted as illustrative and not in a limiting sense. Thus, it will be appreciated that the Drawings are exemplary of a preferred embodiment of the invention.

I claim:

1. A connector for a decorative light set comprising:
   (a) a first clamping member having a substantially, semi-circular body defining a first opening adapted to releasably and grippingly receive a base of a light bulb;
   (b) a second clamping member having a substantially semi-circular body defining a second opening adapted to releasably and grippingly receive a frame member, wherein said first and second clamping members are fixedly coupled each to the other forming an open numeral 8 contour having said first and second openings formed in linearly aligned relation within opposing ends of said contour, said first and second clamping members each having a flat upper surface and a flat lower surface, wherein said said upper surfaces are coplanar and said lower surfaces are coplanar.

* * * * *